(12) United States Patent
Williamson et al.

(10) Patent No.: US 6,915,519 B2
(45) Date of Patent: Jul. 5, 2005

(54) PLUGGABLE JMS PROVIDERS IN A J2EE SERVER

(75) Inventors: Leigh Allen Williamson, Austin, TX (US); Roger L. Cundiff, Jr., Austin, TX (US); Thomas Edward Musta, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 687 days.

(21) Appl. No.: 09/902,890

(22) Filed: Jul. 12, 2001

(65) Prior Publication Data

US 2003/0014554 A1 Jan. 16, 2003

(51) Int. Cl.[7] .............................................. G06F 9/46
(52) U.S. Cl. ........................ 719/313; 719/311; 719/315
(58) Field of Search ................................. 719/311, 313, 719/315

(56) References Cited

U.S. PATENT DOCUMENTS

| | | | | |
|---|---|---|---|---|
| 5,265,206 | A | 11/1993 | Shackelford et al. | 395/200 |
| 6,003,094 | A | 12/1999 | Dean | 709/315 |
| 6,167,432 | A | 12/2000 | Jiang | 709/204 |
| 6,633,923 | B1 * | 10/2003 | Kukura et al. | 719/316 |
| 2002/0004848 | A1 * | 1/2002 | Sudarshan et al. | 709/310 |
| 2002/0004850 | A1 * | 1/2002 | Sudarshan et al. | 709/313 |
| 2003/0005117 | A1 * | 1/2003 | Kang et al. | 709/225 |

OTHER PUBLICATIONS

"Java [TM] 2 Platform Enterprise Edition Specification, v1.3" by Sun Microsystems, downloaded on Apr. 18, 2001 from www.sun.com, 174 pages.
"Java [TM] Message Service", Version 1.0.2, Nov. 9, 1999, by Sun Microsystems, 110 pages.

* cited by examiner

Primary Examiner—Thomas Lee
Assistant Examiner—Li Zhen
(74) Attorney, Agent, or Firm—Robert H. Frantz; David A. Mims, Jr.

(57) ABSTRACT

A method for allowing an enterprise application server to integrate and make use of any messaging product or products that support a standard messaging service interfaces. In a first phase of the method, an administrator creates and installs a new messaging provider on an application server, creates new messaging resource objects such as connection factories and destinations, and then binds these into the original namespace of the default messaging provider. An application which references the new messaging provider is then deployed onto the application server. Then, when the application program is executing, it may perform a lookup for the new messaging service, which the application server performs through the default context factory to obtain a new messaging object, which is then handed to the requesting application for use as needed. This method of indirection allows the application server to integrated and use any messaging service, not just the default messaging server originally integrated by the application server vendor.

21 Claims, 5 Drawing Sheets

PLUGGABLE JMS PROVIDERS IN A J2EE SERVER

BACKGROUND OF THE INVENTION

1. Field of the Invention

This invention relates to the arts of enterprise application servers, and especially to the technologies of extensible communications libraries available to applications being executed by an application server.

2. Description of the Related Art

Application servers are prevalent throughout business, scientific and entertainment industries, as they provide everything from "back office" automation such as billing, accounting, and order entry functions; to customer interface functions such as allowing clients to place orders directly into a suppliers computers, reserve products or services, and manage their own accounts; to online entertainment and gaming systems which allow customers to access games and useful information in trade for being presented marketing information, banner advertisements, and sponsored hyperlinks. As such, application servers may communicate with client computers via a corporate intranet or private computer network, via a publicly accessible network such as the Internet, or both.

An application server is a server computer and one or more programs that provides the logic for an online or automated application, and is typically part of a larger, distributed computing system. Application servers are often modeled as a component of a three-tier system having a graphical user interface (GUI) server, an application or business logic server, and a database server.

One such application server is the WebSphere [TM] product from International Business Machines. WebSphere is available for a number of platforms, including computers from personal computers to high-end "main frames" running operating systems ranging from Microsoft Windows NT [TM], to IBM's AIX [TM], to the open source Linux.

A WebSphere application server provides an environment for open distributed computing. Users and processes on a wide variety of platforms can interact by using the facilities provided by WebSphere. A common method of organizing software to run on distributed systems is to separate functionality into two parts: clients and servers. A client is system that runs one or more programs and uses services provided by server systems, the server systems themselves running one or more server programs. The client system makes a request for a service to the server system, and a server system performs that service on behalf of the client system.

For many applications, the application server cooperates with or even incorporates a Web server, such as a hyper text transfer protocol (HTTP) server, for communicating with web browser computers as the client computers. In such an instance, the application server is often referred to as a "Web Application Server" or "Web Server". In this configuration, a web browser client allows the user interface to be implemented in the well-known hyper text markup language (HTML). A typical web server provides one or more well-known methods to forward a request to an application server and to return information to the user, including: Common Gateway Interface (CGI), Microsoft's [TM] Active Server Pages (ASP), Java Server Pages (JSP), or even the more advanced Common Object Request Broker Architecture (CORBA).

Server system functionality usually includes "resource management", through which a server synchronizes and manages access to one or more "resources" such as databases or database servers. Client requests are received by the server system, processed, and appropriate accesses to the resources are made. A response to the client system is then created and transmitted to the client system. This general model is applicable to many server paradigms, including online banking, order entry and tracking, e-commerce, and even electronic mail processing.

Client programs typically handle user interactions, such as presenting drop down lists, menus, pages of information, and "playing" animated graphics or audio. Client programs also typically include functionality to request data or to initiate some data modification on behalf of a user by the server system. For example, a client system can display a form on which a user can enter orders for a product. The client may then transmit this order information to a server system, which checks a product database and performs tasks needed for billing and shipping.

In many cases, a single server system is used by multiple clients simultaneously. For example, dozens or hundreds of clients can interact with a handful of servers that control database access.

A common model of client/server systems, shown in FIG. 1, uses three tiers: one or more client systems (10) that interact with the users, one or more application servers (12) that contain the business logic of the applications provided to the users, and one or more resource managers (13) and associated data stores (14) that store and retrieve data.

In this model, the network (11) between the clients and the servers (12) may be a corporate local area network (LAN) or intranet, such as in the case of a corporate application server which is not publicly accessible. In this case, the client systems may be provided with any specific software programs, such as IBM's Lotus Notes, which cooperates with the application server programs. For applications which are intended for widespread use or public use, the network (11) may be the Internet, the client computers may be equipped with appropriate web browser software such as Netscape's Navigator [TM], and the application servers are equipped with appropriate HTTP server software, such as the IBM WebSphere product.

The interfaces between the servers (12) and the resource manager(s) (13) may be LAN, Internet, or a proprietary interface. The data stores and databases (14) may be physically housed in separate platforms, or may be integrated to the resource managers (13). In some cases, the resource managers, databases, and application servers may be software processes all executing on the same platform, too.

Using this arrangement of systems and functionality, the client systems (10) are isolated from having to know anything about the actual resource managers (13) and resources (14). It needs only to have the capability to communicate and interact with the server systems (12), and does not have to have specific capabilities or software to communicate directly with the resources (14). This allows a service provider to make changes to the resource tier of the arrangement without requiring changes to the client systems.

For example, a bank may install a new system of databases for online loan processing. With this arrangement, an HTML web browser client computer may be enabled to access these new databases and online loan services through changes to the server computer programs only, without need for changes to the client computer. Since most servers are relatively few in number compared the to vast number of client computers (and potential client computers) they server, this is an significant advantage of the arrangement. Additionally, the resource manager can be assigned the task of security and access control such that users requesting secure data from the resources may be allowed or denied access to that data.

Because there is often need to rapidly develop and deploy in the market place new business applications and enhancements to existing business applications, there are several "standards" with which most application servers are compatible. This allows the business application program developers to work within programming and computing environments in which they are familiar, regardless of which specific application server platform will eventually execute the application.

In recent years, Sun Microsystems' Java [TM] programming language and programming environment have gained widespread acceptance and use due to its portability between a wide variety of platforms, and due to its object oriented methodology.

Java client programs, or "applets", can be delivered by a server computer to a client computer using common protocols such as HTTP, with links to retrieve the applets embedded in forms or web pages. Server programs are often implemented as a collection of "servlets".

Recently, Sun Microsystems has extended the definition of the general Java environment to include more enterprise and distributed computing functionality, called Java platform Version 2 Enterprise Edition (J2EE). J2EE supports the 3-tiered model of client-server-resource manager, as previously described. The J2EE platform is a platform for hosting J2EE applications specified as a set of required application program interfaces (APIs) and policies. The J2EE specifications and documentation are readily available from Sun Microsystems, and J2EE is well-known by those skilled in the art.

One of the features or benefits of adopting the J2EE platform as a programming model for an application server, or at least as a programming model with which to be compliant or compatible, is the Java Messaging Services (JMS) structure of the J2EE platform.

Whereas enterprise messaging is recognized as an essential capability for building enterprise applications quickly and efficiently, JMS combines the Java programming methodology with enterprise messaging through a JMS API. JMS enterprise messaging provides a reliable, flexible service for the asynchronous exchange of critical business data and events throughout an enterprise and between applications, resources, and clients.

A JMS application has several parts, including at least one "JMS provider", one or more "JMS clients", a plurality of "JMS messages", a set of "administered objects", and possibly some non-JMS clients.

A JMS provider is a messaging product which implements the standard JMS interfaces, and it provides control and administrative functions. JMS clients are components and application programs which produce and/or consume JMS messages. JMS messages are objects for communicating information and data between JMS clients, and administered objects are pre-configured JMS objects for the use of clients (e.g. JMS objects under administrator control rather than developer control).

The JMS interfaces, parts and methodology are well known in the art, and the specifications are readily available from Sun Microsystems [TM].

The application programming interface (API) specification for JMS defines two "domains" for types of messaging—point-to-point (PTP) and publish/subscribe. It requires a J2EE provider to implement both messaging types or domains. A PTP messaging product allows a message producer to specify a specific queue for holding the message, and message consumers may specify a certain queue to hold their messages. This allows a very deterministic communications path to be established. The publish/subscribe messaging domain is more useful for broadcast messages and point-to-multipoint types of data services, where the data producer is less aware of one or more consuming clients which may be receiving the information. This allows for more anonymity between the producers and consumers, as well. Both types of messaging are well-known in the art, and are fully described by the readily available JMS specifications.

A generalized illustration of the JMS API programming model (20) is shown in FIG. 2. Destinations (26, 29) and connection factories (21) are typically administered objects, e.g. objects under the control of an administrator rather than an application developer. As JMS clients access the factories and destinations through the JMS API, the JMS clients are portable from one JMS implementation to another regardless of the specifics of the implementation of the JMS API. JMS clients must simply "look up" the administered objects using the Java Naming and Directory Interface (JNDI) after the administered objects have been placed in the application server's namespace by the administrator.

A connection factory (21) is used by a client to create a connection with a provider, and it encapsulates a set of connection configuration parameters defined by the administrator. The destinations (26, 29) are objects to which JMS client message producers (24) may output or write messages, and from which JMS client message consumers (28) may input or read messages. In a point-to-point messaging scheme, the destination(s) are configured as queues, and in a publish/subscribe messaging scheme, the destinations are configured or referred to as "topics".

A connection (22) encapsulates a virtual connection with a JMS provider, such as an open Transmission Control Protocol/Internet Protocol (TCP/IP) connection between a JMS client and provider service daemon or process. A single connection can be used to create one or more sessions (25), which are eventually closed with when the connection is closed.

A session (22) is a single instance of a communication path for producing and consuming messages. For example, a TCP/IP connection can be created with 4 sessions, so that each session operates as a single, independent TCP/IP communication path between message producers and message consumers.

The J2EE specification mandates that compliant application server products must support the use of JMS resources by the applications that run in the server. Currently available J2EE application server products support some form of built in JMS support library, but these libraries are limited to one preselected JMS library from one particular JMS provider. Due to the variety of implementations of the JMS libraries, and the typical tradeoffs involved in optimizing a set of functions for one purpose or another, each JMS library has an inherent set of advantages and disadvantages.

In an environment for an application which is not running on an enterprise application server, an application may link directly to a JMS library, and thus can easily be recombined with alternate JMS libraries through the JMS API. However, when applications are run on a enterprise application server, applications (31) do not directly link to any server resources, but are indirectly linked to server resources including a JMS library (33) by the application server (32) itself, as shown in FIG. 3.

There are several third party vendors that supply messaging products which support the JMS specification for application servers, but unfortunately, these JMS providers cannot be easily integrated with other currently available J2EE application servers, especially by an end-user of the enterprise application server suite.

For example, IBM's MQSeries JMS implementation has gained a reputation in the user community for strong affinity with mainframe computers, and for having good support for global transactions. As such, the IBM WebSphere product was initially offered pre-integrated with MQSeries only. However, a certain customer may desire to use a competitive JMS implementation library, such as the Sonic MQ library, which is reputed for lightweight and fast messaging service, but not particularly well suited for global transactions. But, this certain customer may need for a specific application the quickness of the Sonic MQ library, and may not need the mainframe support of the MQSeries. This, then, becomes a critical decision factor in whether or not to purchase the entirety of the WebSphere enterprise server product for that certain customer.

Other application server products currently offered on the market are also pre-configured with a preselected JMS library of the supplier's choice, not the user's choice. As such, one significant marketing and technical factor for evaluation when selecting a application server product to use is the JMS library it provides. This unnecessarily complicates the decision process of which application server to use, and may limit the potential customer base for an application server based upon which JMS library is included with the server suite software.

Further, a customer may purchase one application server suite including an acceptable JMS library at one time, and then sometime later after communications requirements have changed or evolved, find that the purchased application server's JMS library does not meet the needs of the future applications.

Therefore, there is a need in the art for a system and method which allows an application server to integrate and make use of any messaging product that supports the JMS interfaces. Further, there is a need in the art for a system and method which supports not only one, but multiple JMS libraries within a single server such that each application can selectively use library functions in an optimal manner.

BRIEF DESCRIPTION OF THE DRAWINGS

The following detailed description when taken in conjunction with the figures presented herein provide a complete disclosure of the invention.

SUMMARY OF THE INVENTION

Figure 1:
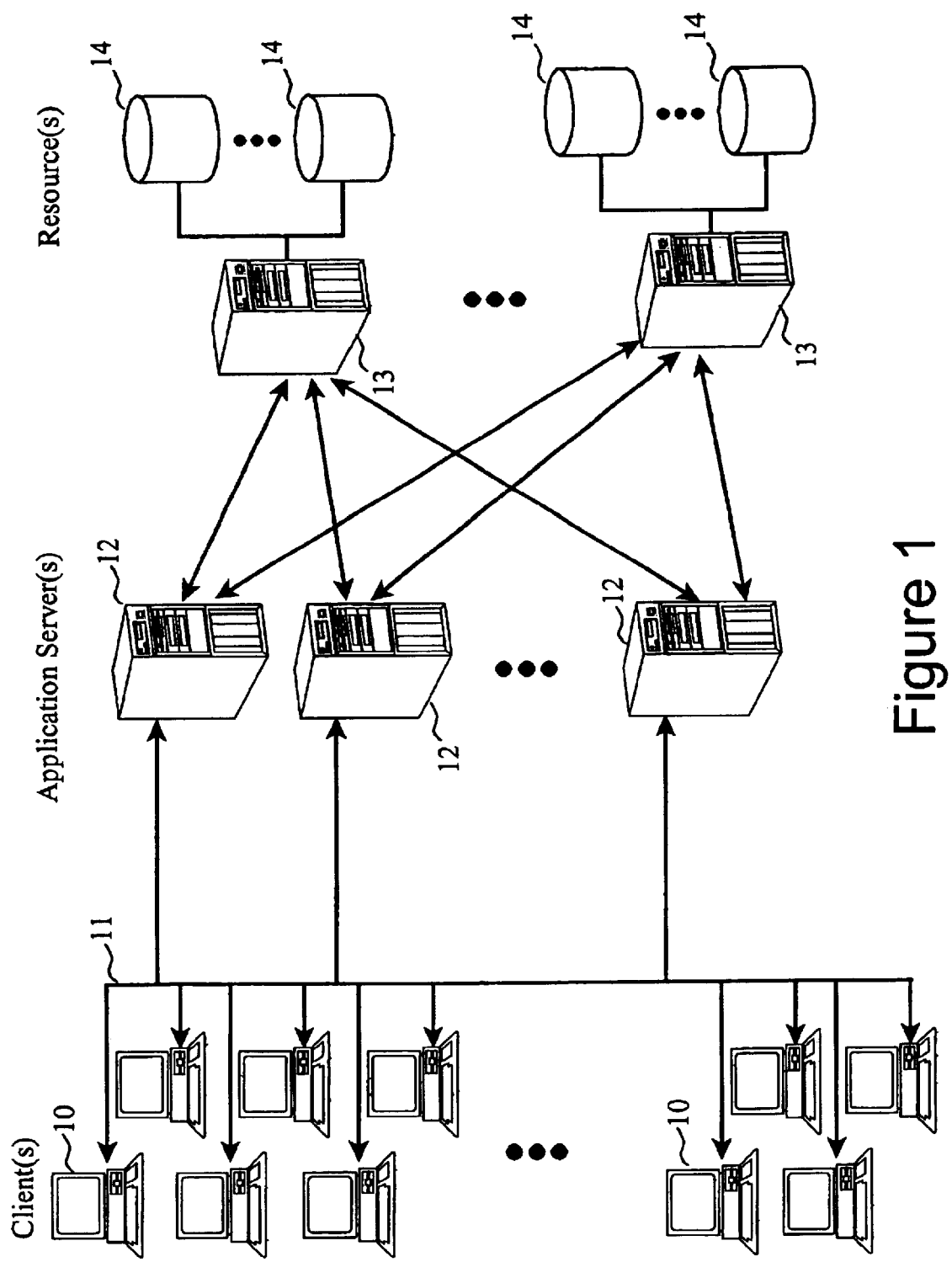
FIG. 1 shows the well known three-tiered model of client-server arrangements in enterprise computing.
Figure 2:
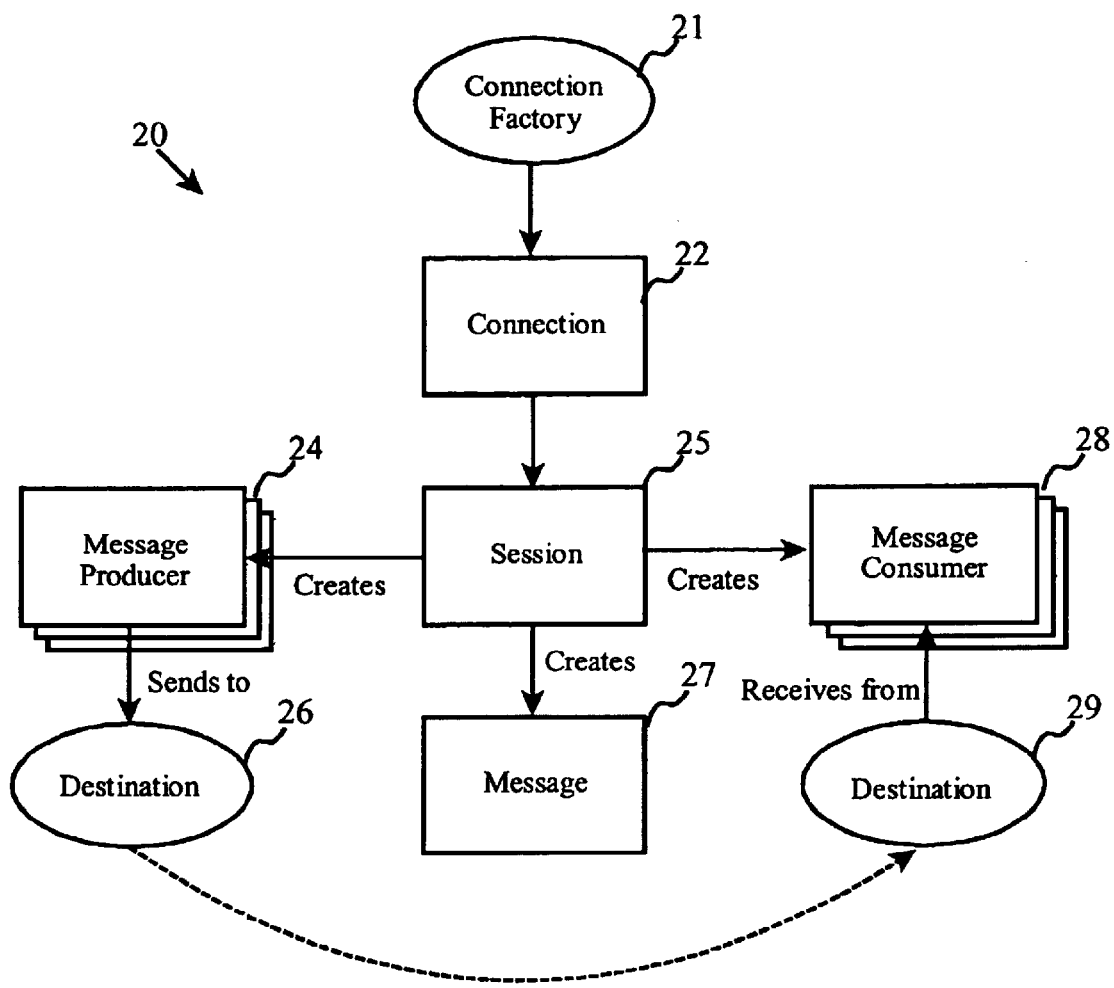
FIG. 2 depicts the application programming interface model of the Java Messaging Service.
Figure 3:
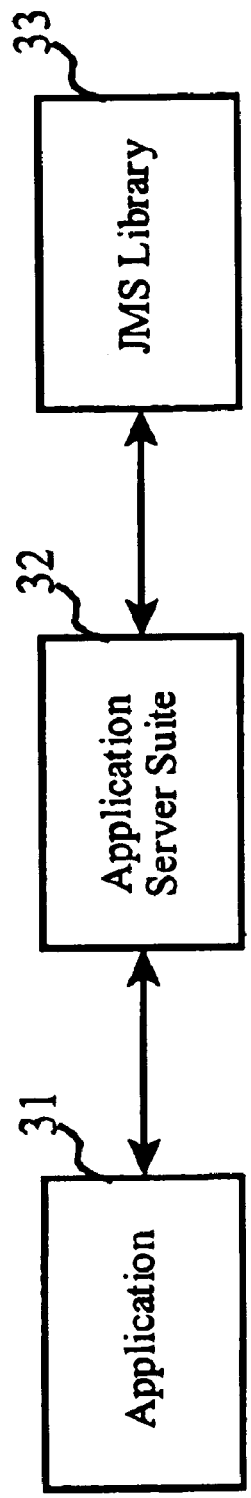
FIG. 3 illustrates in the indirect access to a messaging library by an application program when running on an application server.

This invention allows an enterprise application server to integrate and make use of any messaging product or products that support the standard JMS interfaces. By simply gathering some information in the administrative console, the JMS resources supported by third party vendors and/or proprietary JMS resources can be accessed and used by applications being served by the application server product. This allows a broader set of applications to be integrated and to be optimally served by the so-equipped application server product, and eliminates purchase decision issues related to JMS support, both for present application needs and for future application requirements.

In a first phase of the new method, an administrator creates and installs a new messaging provider on an application server, and binds these into the original namespace of the default messaging provider. An application which references the new messaging provider is then deployed onto the application server. Then, when the application program is executing, it may perform a lookup for the new messaging service, which the application server performs through the default context factory to obtain a new messaging object, which is then handed to the requesting application for use as needed. This method of indirection allows the application server to integrate with and use any messaging service, not just the default messaging server originally integrated by the application server vendor.

DETAILED DESCRIPTION OF THE INVENTION

The present invention provides a system and method for an application server to support the use of any JMS resources in a "pluggable" manner. The invention is preferably realized as a combination of "standard" or well-known software, combined with an implementation of the method of the invention in software, all executing on a commonly available computing platform.

Use of this invention in a "standard" application server makes the improved application server more flexible and useful for Application Integration because the use of a specific or preselected JMS provider is not limited to the default one integrated into the enterprise platform by the enterprise platform vender, such as the limitations found in the presently available enterprise platforms.

Therefore, a broader set of applications can be integrated and served by the so-equipped application server products.

In the preferred embodiment, the "standard" software used is an IBM WebSphere Application Server, release 4.0 (or higher), running on a personal platform with Microsoft's Windows NT [TM] operating system. Those skilled in the art will readily recognize that many alternate computing platforms, operating systems, and enterprise application server suites may be used with the present invention without departing from the scope of the invention. Such alternates may include, but are not limited to, UNIX, Linux, AS/400, IBM's AIX [TM], Sun Microsystem's Solaris [TM], Hewlett-Packard's HP-UX [TM] operating systems, running on common computer platforms such as mid-range servers, IBM AS/400's, IBM System 390's, etc.

Through use of the method of the invention, applications which are developed as a Java Version 2, Enterprise Edition, (J2EE) Enterprise JavaBeans (EJB) may make use of a variety of JMS providers as needed and for optimal performance.

The remainder of this disclosure presents the method of the invention in a manner suitable for realization as actions taken during configuration of an application server by an administrator (or an automated administration configuration process), and as actions performed by an application component such as an EJB or servlet during runtime. It will be recognized by those skilled in the art that other equivalent implementations may be possible, using other programming methodologies, server suites, and computing platforms, without departing from the scope of the invention.

In the J2EE platform, the applications may link to their needed resources by indirection through Java Naming Directory Interface (JNDI) lookup. As such, the applications themselves don't contain any knowledge or details regarding their linked resources, other than the fact that the resources can be instantiated as objects of the particular resource type. Essentially, during runtime, the application simply performs a "lookup" on a specified string which contains the name of the resource regarding the resource configuration.

The application server codeflow receives the lookup, retrieves one of the JMS requested resources, and returns it to the requesting application. The application casts it as the appropriate JMS resource type, e.g., JMSQueue, and then begins to use the resource by establishing a connection to it using the standard Java APIs. The resource may not be co-located with the application, but may be remotely invoked or used over a computer network in some instances. This process is part of the standard, well known J2EE platform.

The following method extends the ability to support any JMS provider beyond the default JMS provider, whether that be a proprietary JMS API implementation or a third-party JMS API implementation.

The method of the invention comprises two phases, the first of which involves administrative action to install an alternate or additional JMS implementation library during server configuration, and the second phase including the runtime access of the new JMS library by an application component on the running application server.

Figure 4:
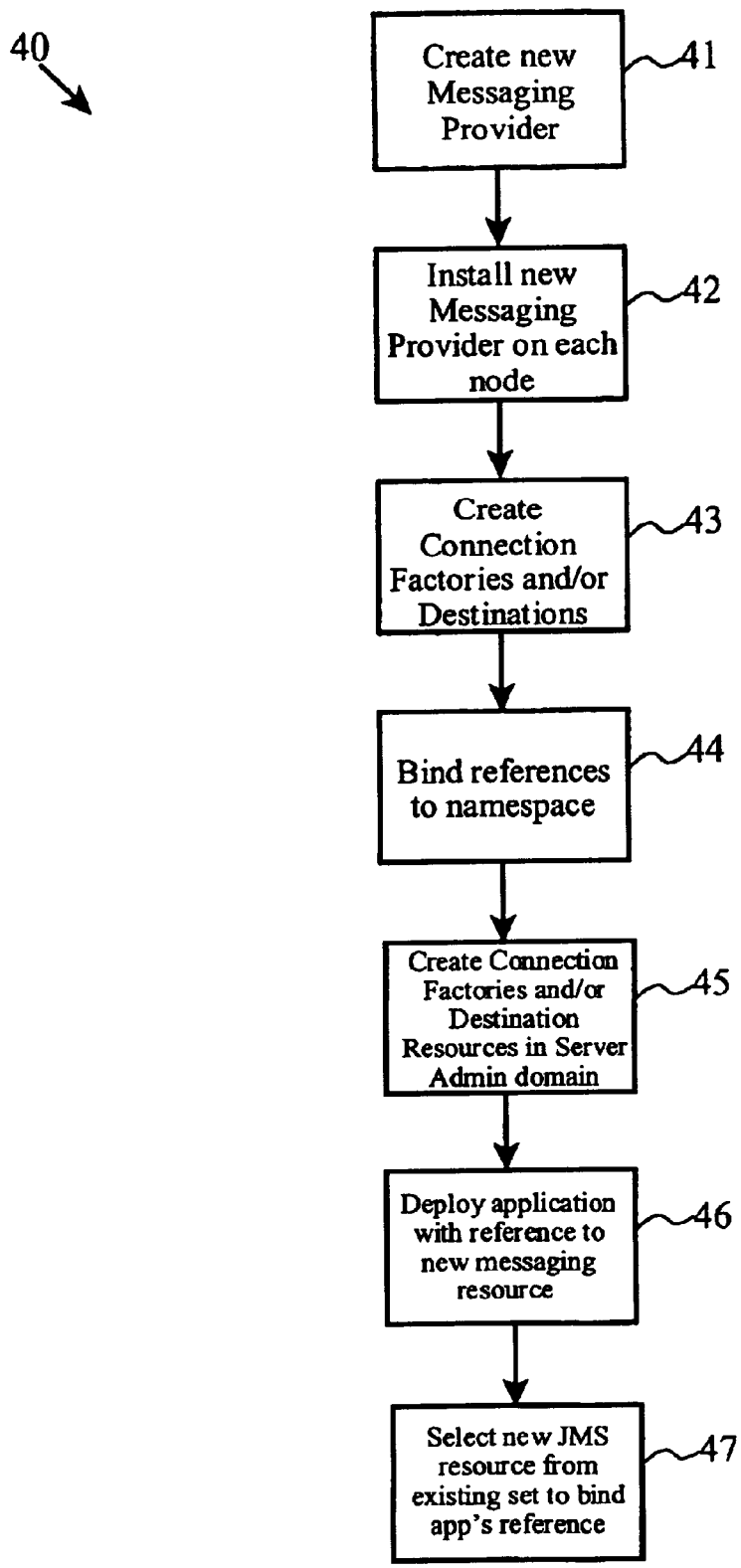
FIG. 4 sets forth the logical flow of the process to configure a new messaging service on an application server.

Turning to FIG. 4, the logical flow of the method (40) for configuring an application server for an alternate JMS implementation library (or additional library) is shown. First, an administrator creates (41) a new JMS Provider, and specifies the name, description, initial context factory, provider URL, and optionally a JNDI binding mechanism class name. In alternate embodiments (non-J2EE), an alternate naming service may be used, of course.

Next, the administrator installs (42) the new JMS Provider on each desired application server node, and specifies the classpath on each node (i.e., location of the Provider's jar file on the node).

Then, the administrator uses JMS vendor's administration tool to create (43) JMS Connection Factories and/or JMS Destinations, and to bind (44) references to these into a namespace.

The administrator also creates (45) new JMS Connection Factory and JMS Destination resources in the WebSphere (or other enterprise server suite) administration domain, specifying the name, description, and external JNDI name, i.e., the location where they were bound using the JMS vendor's administration tool.

Finally, the administrator deploys (46) an application, such as an application EJB or servlet, which contains a reference to a new JMS resource, and the administrator selects (47) a new JMS resource from the existing set of defined resources to bind to the application's reference.

Figure 5:
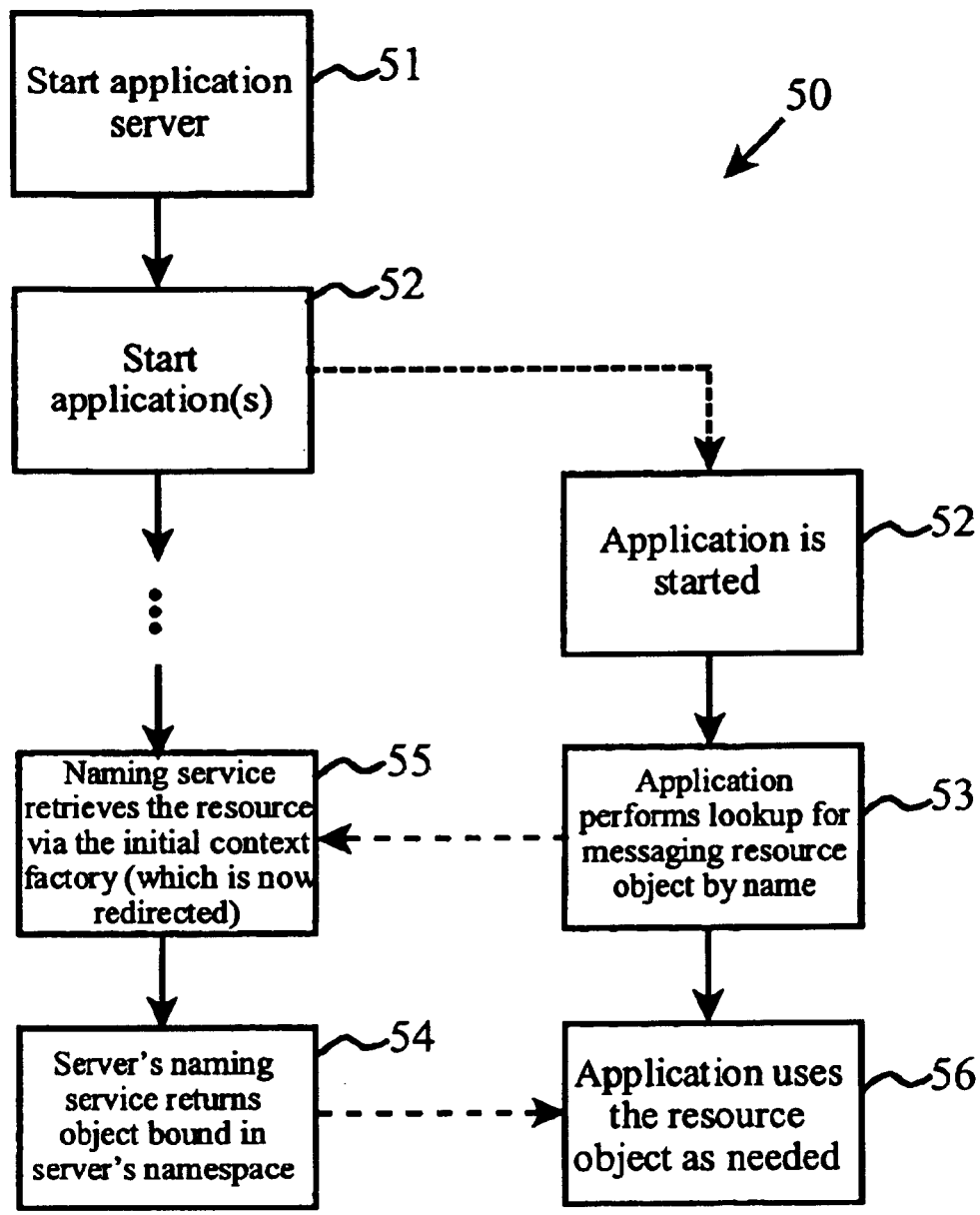
FIG. 5 sets forth the logical flow of the process to obtain reference to and make use of a replacement messaging service on an application server by an application program.

Turning to FIG. 5, the process (50) followed during runtime of the application server and the application component is shown. Initially, the application server with this application is started (51) and initialized, of course, followed by starting (52) one or more instances of the application component which was deployed during the configuration phase (e.g. an application component which needs the new JMS resource).

The application component then performs (53) a naming service lookup, such as a JNDI lookup (e.g., lookup "java:comp/env/jms/<logical name>") for which the application server's naming service returns (54) the JMS Connection Factory or JMS Destination object which was bound in the namespace during configuration of the server. The application server's naming service makes use (55) of the initial context factory and Provider URL specified by the JMS Provider in order to perform this lookup, thereby allowing the system to access namespaces other than that originally configured into the application server. Some JMS vendors may have unique requirements for performing a lookup in their namespace. In this case, the system will make use of the JMS Provider's JNDI binding mechanism class.

The application can then utilize (56) the JMS Connection Factory or Destination, making use of the new or additional JMS Provider's implementation.

As can be seen from these processes, it is actually possible to support not only alternate JMS implementations, but multiple implementations simultaneously. For example, an WebSphere [TM] application may be installed with its default IBM MQSeries messaging service. Then, through the configuration method just described, an additional messaging service, perhaps the Sonic MQ library, can also be installed on the system. During initialization of the application component, it simply receives bindings for each specific JMS API function from one or the other JMS library, such that during execution, functions from either library may be used for each JMS service. This allows the administrator and application component developer to use the best or optimal functions from each library.

It will be recognized by those skilled in the art that the foregoing detailed description is given in terms of a preferred embodiment, and that many variations and modifications from the preferred embodiment may be made without departing from the spirit and scope of the invention, such as use of alternate programming methodologies and languages, operating systems, computing platforms, and enterprise application server suites. As such, the scope of the present invention should be determined by the following claims.

What is claimed is:

1. A method of providing an extension to a default set or messaging resource functions in an enterprise application server, said application server having a default context factory class, said method comprising the steps of:

providing an alternate extension messaging service provider on an application server node, said extension messaging service provider having a name, description, initial context factory, and a provider universal resource locator (URL), said application server node also having a default messaging service;

creating one or more extension connection factories and destination resources;

binding references to said extension connection factories and destination resources into a namespace;

creating extension connection factory and destination resources in an application server administration domain; and subsequently accessing and using by an application program said alternate extension messaging service provider, connection factory and destination resources through performance of an indirect naming service lookup through said application server default context factory.

2. The method as set forth in claim 1 wherein said step of providing a extension messaging service provider on an application server node includes the step of specifying a classpath on said application server node.

3. The method as set forth in claim 2 wherein said step of specifying a classpath on an application server node includes specifying a location of the extension messaging service provider's jar file on said application server node.

4. The method as set forth in claim 2 wherein said step of specifying a classpath on an application server node includes specifying a naming service binding mechanism class name.

5. The method as set forth in claim 1 wherein said step of creating extension connection factory and destination resources in an application server administration domain includes specifying a name, description, and an external naming service name.

6. The method as set forth in claim 5 wherein said step of specifying a name, description, and an external naming service name includes specifying a location where said extension connection factory and destination resources were bound into said namespace.

7. The method as set forth in claim 1 wherein said step of providing an extension messaging service provider comprises providing a Java Messaging Service provider.

8. A computer readable medium encoded with software for providing an extension to a default set of messaging resource functions in an enterprise application server computer system, said application server having a default context factory class, said software when executed by an application server to perform the following steps:

provide an alternate extension messaging service provider on an application server node, said extension messaging service provider having a name, description, initial context factory, and a provider universal resource locator (URL), said application server node also having a default messaging service;

create one or more extension connection factories and destination resources;

bind references to said extension connection factories and destination resources into a namespace;

create extension connection factory and destination resources in an application server administration domain; and subsequently access and use by an application program of said alternate extension messaging service provider, connection factory and destination resources through performance of an indirect naming service lookup through said application server default context factory.

9. The computer readable medium as set forth in claim 8 wherein said software for providing a extension messaging service provider on an application server node includes the software for specifying a classpath on said application server node.

10. The computer readable medium as set forth in claim 9 wherein said software for specifying a classpath on an application server node includes software for specifying a location of the extension messaging service provider's jar file on said application server node.

11. The computer readable medium as set forth in claim 9 wherein said software for specifying a classpath on an application server node includes software for specifying a naming service binding mechanism class name.

12. The computer readable medium as set forth in claim 8 wherein said software for creating extension connection factory and destination resources in an application server administration domain includes software for specifying a name, description, and an external naming service name.

13. The computer readable medium as set forth in claim 12 wherein said software for specifying a name, description, and an external naming service name includes software for specifying a location where said extension connection factory and destination resources were bound into said namespace.

14. The computer readable medium as act forth in claim 8 wherein said software for providing an extension messaging service provider comprises software for providing a Java Messaging Service provider.

15. A extension system for a default set of messaging resource functions in an enterprise application server, said application server having a default context factory class, said extension system comprising:

an alternate extension messaging service provider on an application server node, said extension messaging service provider having a name, description, initial context factory, and a provider universal resource locator (URL), said application server node also having a default messaging service;

one or more extension connection factories and destination resources;

bound references to said extension connection factories and destination resources in a namespace;

extension connection factory and destination resources created in an application server administration domain; and an application program interface for accessing and using by an application program said alternate extension messaging service provider, connection factory and destination resources through performance of an indirect naming service lookup through said application server default context factory.

16. The extension system as set forth in claim 15 wherein said extension messaging service provider includes a specification of a classpath on said application server node.

17. The extension system as set forth in claim 16 wherein said specification of a classpath on an application server node includes a location specification of the extension messaging service provider's jar file on said application server node.

18. The extension system as set forth in claim 16 wherein said specification of a classpath on an application server node includes a naming service binding mechanism class name specification.

19. The extension system as set forth in claim 15 wherein said extension connection factory and destination resources includes a specification of a name, description, and an external naming service name.

20. The extension system as set forth in claim 19 wherein said specification of a name, description, and an external naming service name includes a location specification where said extension connection factory and destination resources are bound into said namespace.

21. The extension system as set forth in claim 15 wherein said extension messaging service provider comprises a Java Messaging Service provider.

* * * * *